United States Patent [19]
Godbout et al.

[11] Patent Number: 5,095,677
[45] Date of Patent: Mar. 17, 1992

[54] COMBINATION FOR USE IN MOUNTING A MODULAR SYSTEM

[75] Inventors: Charles Godbout, Montreal; Claude Mauffette, Quebec, both of Canada

[73] Assignee: Les Concepts Polystand Inc., Montreal, Canada

[21] Appl. No.: 909,705

[22] Filed: Sep. 22, 1986

[51] Int. Cl.$^5$ .......................................... E04H 12/00
[52] U.S. Cl. ..................................... 52/648; 403/176
[58] Field of Search .................. 52/648; 403/171, 176

[56] References Cited

U.S. PATENT DOCUMENTS

| | | |
|---|---|---|
| 52,843 | 2/1866 | Gitt . |
| 365,329 | 6/1887 | Cline . |
| 1,070,165 | 8/1913 | Newlin . |
| 1,159,039 | 11/1915 | Johnson . |
| 1,579,159 | 3/1926 | Spikings . |
| 1,946,408 | 2/1934 | Loudy . |
| 2,280,121 | 4/1942 | Green . |
| 2,904,360 | 9/1959 | Gamlen . |
| 2,976,968 | 3/1961 | Fentiman . |
| 3,013,244 | 12/1961 | Rudy . |
| 3,150,891 | 9/1964 | Kirkeby . |
| 3,152,819 | 10/1964 | Fentiman . |
| 3,275,351 | 9/1966 | Fentiman . |
| 3,458,949 | 8/1969 | Young . |
| 3,688,461 | 9/1972 | Rensch ............................ 52/650 |
| 3,791,091 | 2/1974 | Albrizzi ........................... 52/593 |
| 3,864,049 | 2/1975 | Ono ................................. 52/648 |
| 3,966,342 | 6/1976 | Moriya ............................ 52/645 |
| 3,980,408 | 9/1976 | Jachmann ..................... 403/171 |
| 3,982,841 | 9/1976 | Endzweig ..................... 403/171 |
| 4,027,449 | 6/1977 | Alcalde et al. ................. 52/648 |
| 4,077,419 | 3/1978 | Lux ................................ 248/273 |
| 4,094,417 | 6/1978 | Cairnes et al. ................ 211/183 |
| 4,122,646 | 10/1978 | Sapp .............................. 52/648 |
| 4,313,687 | 2/1982 | Martinez et al. .............. 403/171 |
| 4,338,615 | 3/1984 | Wendel ......................... 52/648 |
| 4,353,662 | 10/1984 | Du Chateau .................. 52/648 |
| 4,480,418 | 11/1984 | Ventrella ....................... 52/648 |
| 4,485,597 | 12/1984 | Worrallo ........................ 52/36 |
| 4,591,286 | 5/1986 | Inchaurbe ..................... 52/648 |

FOREIGN PATENT DOCUMENTS

| | | | |
|---|---|---|---|
| 1391973 | 2/1965 | France ........................... 52/648 |
| 737530 | 9/1955 | United Kingdom ............ 52/648 |

Primary Examiner—Richard E. Chilcot, Jr.
Assistant Examiner—Joanne C. Downs
Attorney, Agent, or Firm—Foley & Lardner

[57] ABSTRACT

The combination comprises a plurality of extrusions which are interconnected by means of a plurality of connectors thereby defining the modular system. The extrusions can also be interconnected end to end by means of joining members. The extrusions can be made of tubular members which have a first set of equally spaced radial projections provided with outer ribs to engage the connectors. There are also a second set of projections disposed between the first set of projections so as to enable panels to be disposed between the first and second projections. The connectors include a rod and clamping members at both ends of the rods to engage the ribs formed on the first set of projections. The joining members are spherical and have projecting stud members which are pressed fittingly engageable in the tubular extrusions for end to end connections thereof.

4 Claims, 2 Drawing Sheets

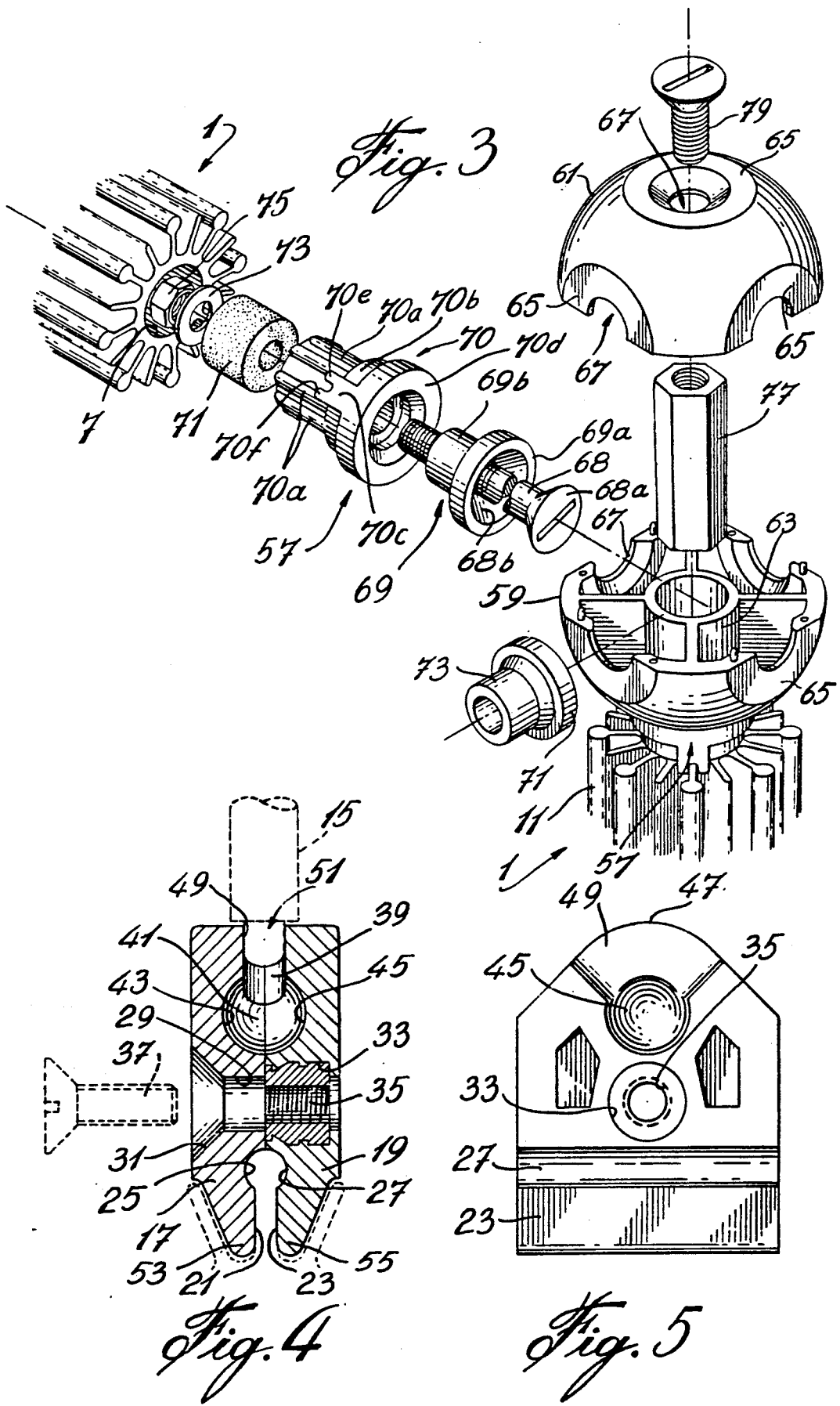

COMBINATION FOR USE IN MOUNTING A MODULAR SYSTEM

BACKGROUND OF INVENTION a) Field of Invention

This invention relates to a modular system. More particularly, the present invention is concerned with a combination including specially designed extrusions, connectors and joining members therefor for use in mounting a modular system of various shapes, depending on its intended use.

b) Description of Prior Art

Communication is the most important aspect of creative business marketing. There is therefor an increasing need to express ideas visually such as in exhibit designs, architectural displays, shelvings, etc. Of course, such designs must use a minimum of components, should easily be assembled with the minimum amount of tools into a strong yet light-weight structure, and be easily dismantled for travel. Various structures and designs are known in the art, but none, to applicant's knowledge, provide a system which is easily adaptable to a plurality of uses, yet easy to mount and dismantle.

The following patents are of interest:
U.S. Pat. Nos.:
4,485,597
4,122,646
4,094,417
4,077,419
3,966,342
3,688,461
3,458,949
3,275,351
3,152,819
3,150,891
3,013,244
2,976,968
2,904,360
2,280,121
1,946,408
1,579,159
1,159,039
1,070,165
365,329
52,843

A summary review of the above literature will show that all these references disclose modular systems which are more or less complicated but which do not satisfy the requirements of present day marketing needs.

SUMMARY OF INVENTION

It is an object of the present invention to provide structures which are combined together vertically and horizontally with multidirectional connectors.

It is another object of the present invention to provide a combination for use in mounting a modular system, the combination comprising a plurality of extrusions which are interconnected by means of a plurality of connectors to define the modular system. Each extrusion comprises a longitudinal member, a plurality of equally spaced radial first projections which extend from the longitudinal member and run along the entire length thereof, each first projection being formed with continuous engageable means extending throughout the longitudinal direction of the projection. Each connector comprises a rod, engaging members articulately mounted at both ends of the rod to engage the engageable means in sliding engagement therewith. The engaging means have adjustable means operable to be fixedly engaged with the engageable means, and means to enable articulation of the engaging means with respect to the rod essentially along a plane which is parallel to the longitudinal member.

According to a preferred embodiment of the invention, the longitudinal member is tubular, and the first projections are preferably arranged in star shaped fashion about the tubular member.

According to another preferred embodiment of the invention, the engageable means provided on the projections consist of a continuous rib extending the entire length of each first projection. The continuous rib is preferably circular in cross-section and is formed along the outer edge of each first projection. There are preferably eight such first projections around the tubular member, although any desired number of first projections can be provided depending on the intended use of the modular system.

In accordance with another preferred embodiment of the invention, there are a plurality of equally spaced radial second projections which extend from the tubular member and run along the entire length thereof. Each second projection is disposed between two adjacent first projections and define therewith panel receiving grooves.

In accordance with another preferred embodiment of the invention, the engaging means are made of a pair of facing clamping members.

In accordance with another preferred embodiment of the invention, there are providing joining members to join together a plurality of tubular extrusions in end to end relationship, unidirectionally or at right angle to one another.

BRIEF DESCRIPTION OF DRAWINGS

The invention will now be illustrated by means of the following drawings which are given only for the purpose of illustration and are not intended to restrict the invention thereto. In the drawings which illustrate the invention:

FIG. 3 is an exploded view of the joining member and of its connection to a tubular extrusion;

FIG. 4 is a longitudinal cross-section view of a clamping member;

FIG. 5 is a side view of the same clamping member.

DESCRIPTION OF PREFERRED EMBODIMENTS

Figure 1:
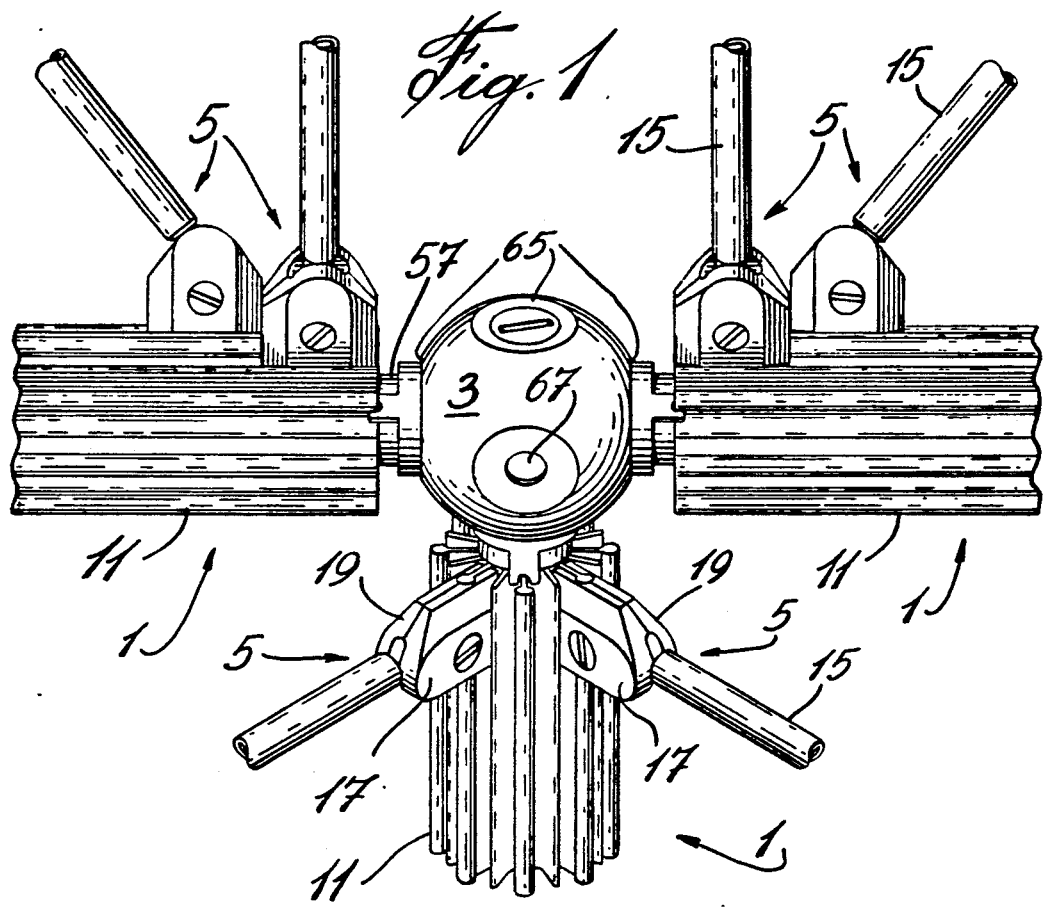
FIG. 1 is a perspective view of part of a modular system according to the invention.

With reference to the drawings, it will be seen that a modular system can be mounted in a variety of shapes using a combination partly illustrated in FIG. 1. The combination essentially comprises a number of extrusions 1, one or more joining members 3 and a certain number of connectors 5.

The extrusions will now be defined more in detail with particular reference to FIGS. 1 and 3. Each extrusion 1 is a longitudinal member which is generally tubular as shown by the bore 7 formed therein. Around the longitudinal tubular member 7, there are 8 equally spaced radial projections 9 which extend from the tubular member 1, and as seen in FIG. 1, run along the entire length thereof. In cross-section, the projections 9 are seen to be arranged in star shaped fashion about the tubular member 1.

Along the outer edge of each projection 9, there is a continuous rib 11 which is circular in cross-section and also extends the entire length of each projection 9.

Figure 2:
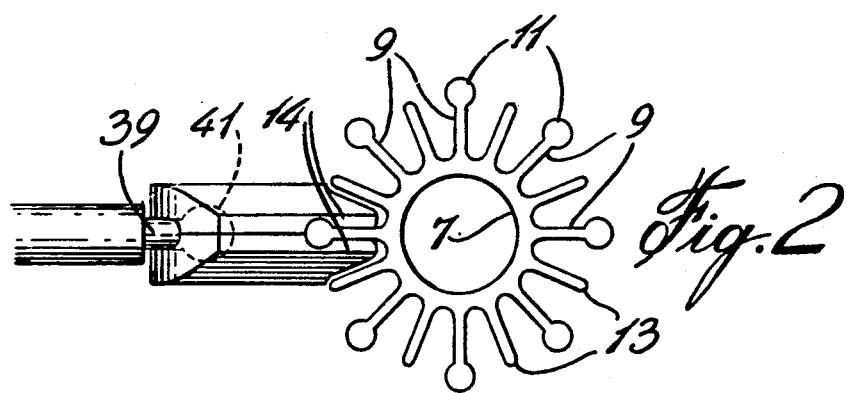
FIG. 2 is a view showing a connector engaged with a tubular extrusion.

The extrusion also comprises a second set of radial projections 13 which are similar to projections 9, except for the rib 11. These projections 13 also extend from the tubular member 1 and run along its entire length. As shown in FIGS. 1, 2 and 3, it will be seen that each projection 13 is disposed between two adjacent projections 9 to define a groove 14. These grooves 14 are appropriately designed to receive the edge of a panel (not shown) to provide a decoration or for other uses well known to those skilled in the art. Of course, the extrusion can be constructed to be provided with any desired number of projections 9 and 13 depending on circumstances and again, intended use of the modular system.

As mentioned above, the combination according to the invention comprises a number of connectors 5. It will be seen that each connector comprises a rod 15 which is articulately connected in a manner which will be described more in detail hereinbelow to an engaging means formed of a pair of facing clamping members 17, 19. As will also be discussed later, the engaging means defined by the clamping members 17, 19 are intended to engage the ribs 11 in sliding engagement therewith. The clamping members 17, 19 each have a substantially flat inner face 21, 23, as particularly shown in FIG. 4 of the drawings. The inner faces 21, 23 of both clamping members 17, 19 are each formed with half circular transverse recesses 25, 27 which face one another and are capable of opening and closing relative to the circular rib 11 as will be seen later. To do this, each clamping member is formed with a suitable transverse bore which will now be defined. Clamping member 17 has a bore 29 which has a conical portion 31 to receive the conical head of a bolt which will be mentioned later. With respect to clamping member 19, it is provided with a bore 33 and a threaded dodge insert 35. A bolt with a counter-sunk head 37 is inserted through bore 29 and is screwed in dodge insert 35 to connect the two clamping members 17, 19 together. Therefore, for achieving the opening and closing of the clamping members 17, 19, it is merely necessary to screw or unscrew the counter-sunk head 37.

As mentioned above, the clamping members are designed to be articulated at the end of rod 15. For this purpose, an arm 39 of smaller diameter than the rod 15 is provided at both ends of the rod 15. Each arm is terminated into a ball joint 41 so that the arm 39 connects the rod 15 to the ball joint 41. Referring again to the clamping members 17, 19, it will be seen that the inner faces 21, 23 thereof are formed with socket cavities 43, 45 to receive ball joint 41. It was mentioned above that the clamping members 17, 19 are articulated at the end of rod 15. This is in part made possible by the provision of arm 39, ball joint 41 and socket cavities 43, 45. However, in order to enable the clamping members to articulate along a plane parallel to that of the rod, each clamping member, at the end which received the ball joint is shaped in the form of an arc of a circle 47 as particularly shown in FIG. 5. In addition, a cut-out portion 49 which has the particular shape illustrated in the FIGS. 4 and 5 is formed along the arc of circle 47 so that the cut-out portions of the two facing clamping members 17, 19 define a channel 51 therebetween which allows the arm 39 to pivot in the channel along a plane defined by the inner faces 21, 23 of the clamping members 17, 19 and of the rod 15.

Finally, in order to enable the ends of the clamping members which engage the rib 11 to penetrate in the grooves 15, the ends 53, 55 are pointed as shown in FIG. 4.

As mentioned above, the combination according to the invention may also include a joining member 3 to connect the extrusions 1 in end to end relationship so that the extrusions 1 are connected together unidirectionally or at right angle.

The joining member 3 is generally ball shaped and has a number, up to 6, of stud members 57 projecting therefrom unidirectionally or at right angle to one another. As will be discussed later, the stud members are pressed fittingly insertable in the bore 7 of a tubular extrusion to hold the same as will be described below.

With particular reference to FIG. 3, it will be seen that the ball shaped joining member 3 is made of a pair of semi-spherical shells 59, 61 which are adapted to be connected together to form a spherical body. Each semi-spherical shell 59, 61 is formed with a sleeve 63 which extends from the geometric center of the spherical body and the sleeves 63 of both semi-spherical shells must be in continuation of one another to form a continuous passage (not shown) through the spherical body when the semi-spherical shells are assembled together. When the semi-spherical shells 59, 61 are assembled into a spherical body, the latter will be seen to comprise 3 pairs of parallel oppositely disposed flattened portions 65. As seen in the drawings, the 3 pairs of flattened portions 65 are perpendicular to one another and a hole is formed in the spherical body to coincide with the center of each flattened portion 65. This hole is referred to by reference numeral 67. Each stud member 57 is formed of the following combination of cooperating parts: countersunk head bolt 68; a tubular holding member 69 provided with an inner flange 69a and an outer neck portion 69b; a tubular connecting member 70 formed with a plurality of longitudinal outer projections 70a, a collar 70b, a projection engaging member 70c and an abutting shoulder 70d; a rubber ring 71; washer 73 and hexagonal nut 75. It will be realised that the stud member 27 is held by the ball shaped joining member 3 by means of the countersunk head bolt 68 and the tubular holding member 69. For this purpose, the bolt 68 is inserted through the tubular holding member 69 and the two parts are partly engaged by the joining member as follows. The head 68a of the countersunk bolt 68 is received in a conical cavity 68b formed axially at the end of tubular member 69 containing inner flange 69a. On the other hand, the inner flange 69a abuts the inner wall of the joining member 3 around hole 67 and the outer neck portion 69b is allowed to extend through the hole 67 inside tubular connecting member 70 until abutting shoulder 70d rests against flattened portion 65. It will be noted that bolt 68 extends all the way through tubular holding member 70 with an additional portion extending inside the bore 7 of the extrusion 1. Rubber ring is mounted over the addition portion of the bolt and the various parts are held together by means of the washer 73 and hexagonal nut 75. The press fitting engagement of the stud member 57 results from the sizes of the rubber ring 71 and of the projections 70a which are tight against the inner surface of the bore. To prevent rotation of the stud member 57, projection engaging member 70c has a pair of fingers 70e and 70f which embrace the end of a radial projection 13.

To hold the two spherical shells 59, 61 together into a spherical body, a threaded sleeve 77 is disposed in the passages defined by the two sleeves 63. One of the stud members has a threaded end (not shown) which is screwed in the one end of the threaded sleeve 77. A countersunk head bolt 79 is screwed at the other end of the threaded sleeve 77 through a corresponding hole 65 to connect the two semi-spherical shells together.

To form a modular system with the device according to the invention, it is merely necessary to have in mind a pre-established design. Then, a decision is made as to the number of tubular extrusions, connectors and joining members required. The tubular extrusions are connected together by means of the connectors which are unscrewed to enable them to slide over a rib 11 in a position desired. Then, screwing of the countersunk bolt 37 will tighten the connector at the desired location along a rib 11. Each connection is carried out in the same manner. If it is desired to connect a plurality of extrusions in end to end relationship, either unidirectionally, at right angle or both, the joining is made through the use of joining members 3 by inserting stud members 57 in appropriate bore 7 of extrusion members 1.

We claim:

1. A combination for use in mounting a modular system, said combination comprising a plurality of tubular extrusions which are interconnected by means of a plurality of connectors to define said modular system,
   each said extrusion comprising
   a longitudinal member,
   a plurality of equal spaced radial first projections which extend from said longitudinal member and run along the entire length thereof,
   each first projection being formed with continuous independent engageable means extending throughout the longitudinal direction of said projection,
   each said connector comprising
   a rod,
   engaging means articulately mounted at both ends of said rod to engage said engageable means in sliding engagement therewith,
   said engaging means having adjustable means operable to be fixedly engaged by pressing over said independent engageable means,
   means to enable articulation of said engaging means with respect to said rod essentially along a plane which is parallel to said longitudinal member,
   means for joining together a plurality of tubular extrusions in end to end relationship unidirectionally or at right angle to one another, said joining means being adapted to connect up to six tubular extrusions, said joining means being ball shaped and having at least two stud members projecting therefrom unidirectionally or at right angle to one another, said stud members being press fittingly insertable in said tubular extrusions to hold same.

2. A combination according to claim 1, wherein said joining means comprises a pair of semi-spherical shells and threadedly engaging means to connects said semi-spherical members to form a spherical body and means to engage said stud members in said spherical body.

3. A combination according to claim 2, wherein each semi-spherical shell is formed with a sleeve extending from the geometric center of said spherical body, the sleeves of both semi-spherical shells being in the continuation of one another to form a continuous passage through said spherical body when said semi-spherical shells are assembled together, three pairs of parallel oppositely disposed flattened portions formed in said spherical body, the three pairs of flattened portions being perpendicular to one another, a hole formed into each said flattened portion, at least one stud member comprising an inner flange to hold said stud member in one said hole, a threaded sleeve disposed in said continuous passage, one said stud member having an inner threaded end screwed in one end of said threaded sleeve and a flat head screw screwed at the other end of said threaded sleeve to connect said semi-spherical shells to form said spherical body.

4. A combination according to claim 3, wherein said stud member comprises a tubular holding member having an inner flange and an outer neck portion, a conical cavity being axially formed at the end of said tubular holding member containing said inner flange, and a tubular connecting member engaging the neck portion of said tubular holding member, said tubular holding member with said neck portion engaged in said tubular connecting member having said inner flange abutting inner wall of said joining member, said neck portion extending through said hole inside said tubular connecting member, said tubular connecting member having a longitudinal portion to be inserted in said tubular extrusion, and being formed with longitudinal outer projections dimensioned to tight fittingly engage said tubular extrusion, said tubular connecting member also comprising a collar adapted to rest against the end of said tubular extrusion after inserting said longitudinal portion, a projection engaging member integral with said collar and formed with a pair of fingers embracing the end of a projection to prevent rotation of said tubular connecting member, and an abutting shoulder to rest said flattened portion, a bolt inserted through said hole, said tubular holding member and said tubular connecting member, said bolt having an extension past said longitudinal portion, a rubber ring tight fitting in said tubular extrusion and mounted in said extension, and a nut secure at the end of said bolt to constitute said tubular holding member, said tubular connecting member, said bolt and said rubber ring into said stud member.

* * * * *